United States Patent [19]

Rasmussen et al.

[11] Patent Number: 4,640,610
[45] Date of Patent: Feb. 3, 1987

[54] REPRODUCTION CAMERA

[75] Inventors: Vagn N. Rasmussen, Gentofte; Finn Hougaard, Copenhagen, both of Denmark

[73] Assignee: Eskofot A/S, Ballerup, Denmark

[21] Appl. No.: 732,410

[22] Filed: May 9, 1985

[30] Foreign Application Priority Data

Sep. 3, 1984 [DK] Denmark ............................ 4214/84

[51] Int. Cl.⁴ ............................................ G03B 27/60
[52] U.S. Cl. ........................................ 355/73; 355/76
[58] Field of Search .................................. 355/73, 76

[56] References Cited

U.S. PATENT DOCUMENTS

| | | |
|---|---|---|
| 3,369,449 | 2/1968 | Klauss et al. |
| 3,468,606 | 9/1969 | Wolf et al. |
| 3,536,401 | 10/1970 | Mason et al. ........................ 355/73 |
| 4,324,487 | 4/1982 | Nishihama ........................... 355/73 |
| 4,478,511 | 10/1984 | Miyauchi ............................. 355/73 |
| 4,529,300 | 7/1985 | Borjesson et al. .................... 355/73 |

FOREIGN PATENT DOCUMENTS 2052125 10/1970 Fed. Rep. of Germany.
3306921A1 11/1983 Fed. Rep. of Germany.

OTHER PUBLICATIONS

IBM Technical Disclosure Bulletin, vol. 14, No. 7, Dec. 1971, pp. 2002, 2003.

*Primary Examiner*—Monroe H. Hayes
*Attorney, Agent, or Firm*—Cushman, Darby & Cushman

[57] ABSTRACT

A reproduction camera comprises a supporting frame with an original plane, an objective plane, and a picture plane, the planes being mutually displaceable, and a roll delivering a sheet of light-sensitive material, as well as a conveyor means. According to the invention it is shown how the reproduction camera can be controlled by means of one handle, and according the invention said advantage is obtained by the delivery of a desired length of light-sensitive material from the delivery roll being controlled by means of a first pair of rollers, whereas the transport to the picture plane is controlled by means of an overlying and optionally opaque conveyor band with one or more suction cups. These suction cups are activated in the moment the cutting is performed whereafter the transport to the developer is performed by means of the conveyor band.

5 Claims, 4 Drawing Figures

REPRODUCTION CAMERA

FIELD OF THE INVENTION

The invention relates to a reproduction camera comprising a supporting frame with an original plane, an objective plane, and a picture plane, said planes being mutually displaceable, and a roll delivering a sheet of light-sensitive material as well as a conveyor means.

SUMMARY OF THE INVENTION

The object of the invention is to provide a reproduction camera controllable by means of one handle and according to the invention the delivery of a desired length of a light-sensitive material from the delivery roll is controlled by means of a first pair of rollers, whereas the transport to the picture plane is controlled by means of a conveyor band situated thereabove and optionally light-impermissible and further comprising one or more suction cups, the suction cups being activated in the moment the cutting off occurs whereafter the transport to the developer is carried out by means of the conveyor band. As a result all three tempi can be controlled by means of one handle.

The sub-claims concern particularly advantageous embodiments of the reproduction camera.

BRIEF DESCRIPTION OF DRAWING

The invention will be described below with reference to the accompanying drawing, in which.

DESCRIPTION OF PREFERRED EMBODIMENTS

Figure 1:
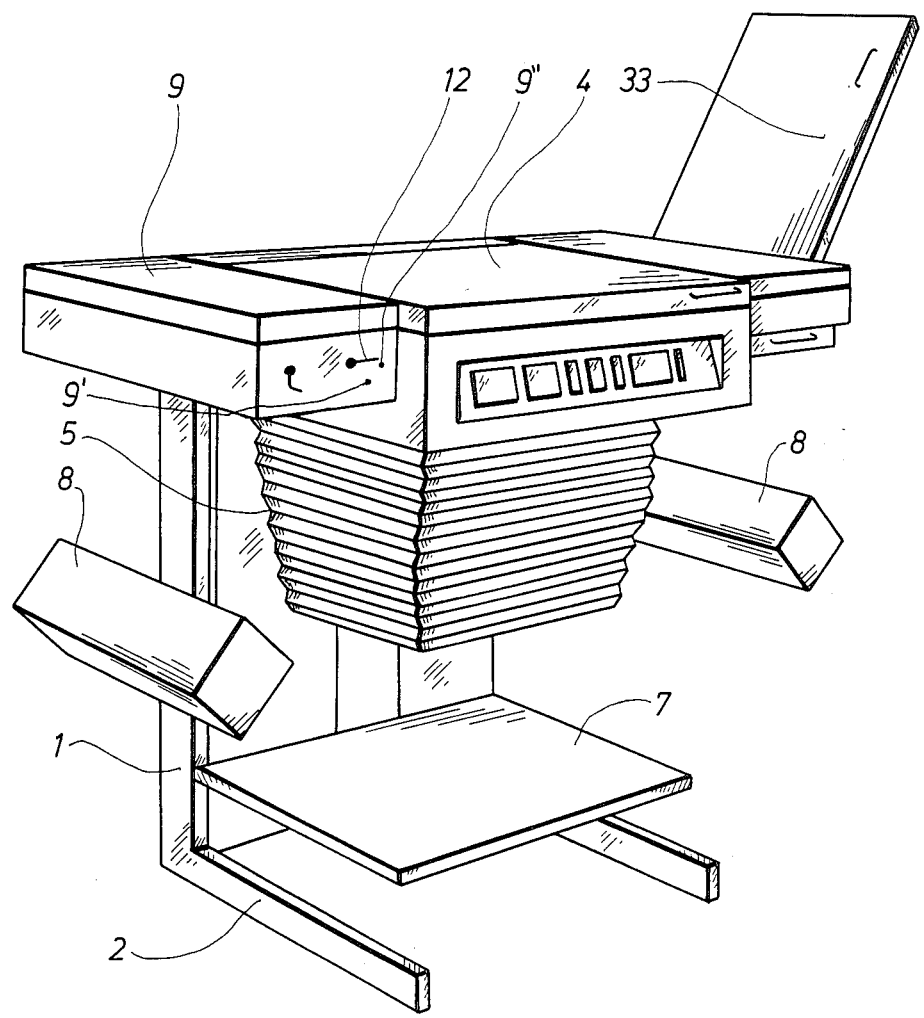
FIG. 1 is a perspective view of a reproduction camera according to the invention.

The reproduction camera of FIG. 1 comprises a frame 1 supported by a foot 2 and at the top carrying a permanent table with a glass plate 3, on which a sheet of light-sensitive material can be placed. A lid 4 can be situated on the glass plate 3. A photographic objective is carried by a bellows 5 and is up- and downwardly displaceable. A table 7 is provided below the objective, said table 7 being mounted in two vertical guides formed by the columns of the frame 1. In this manner the table is up- and downwardly displaceable, i.e. towards and away from the objective. The table 7 supports a photographic objective such as a drawing or a typing paper to be photographed, i.e. projected on the glass plate 3 through the objective.

Illuminating means 8 are adapted to expose the original document on the table 7.

Figure 2:
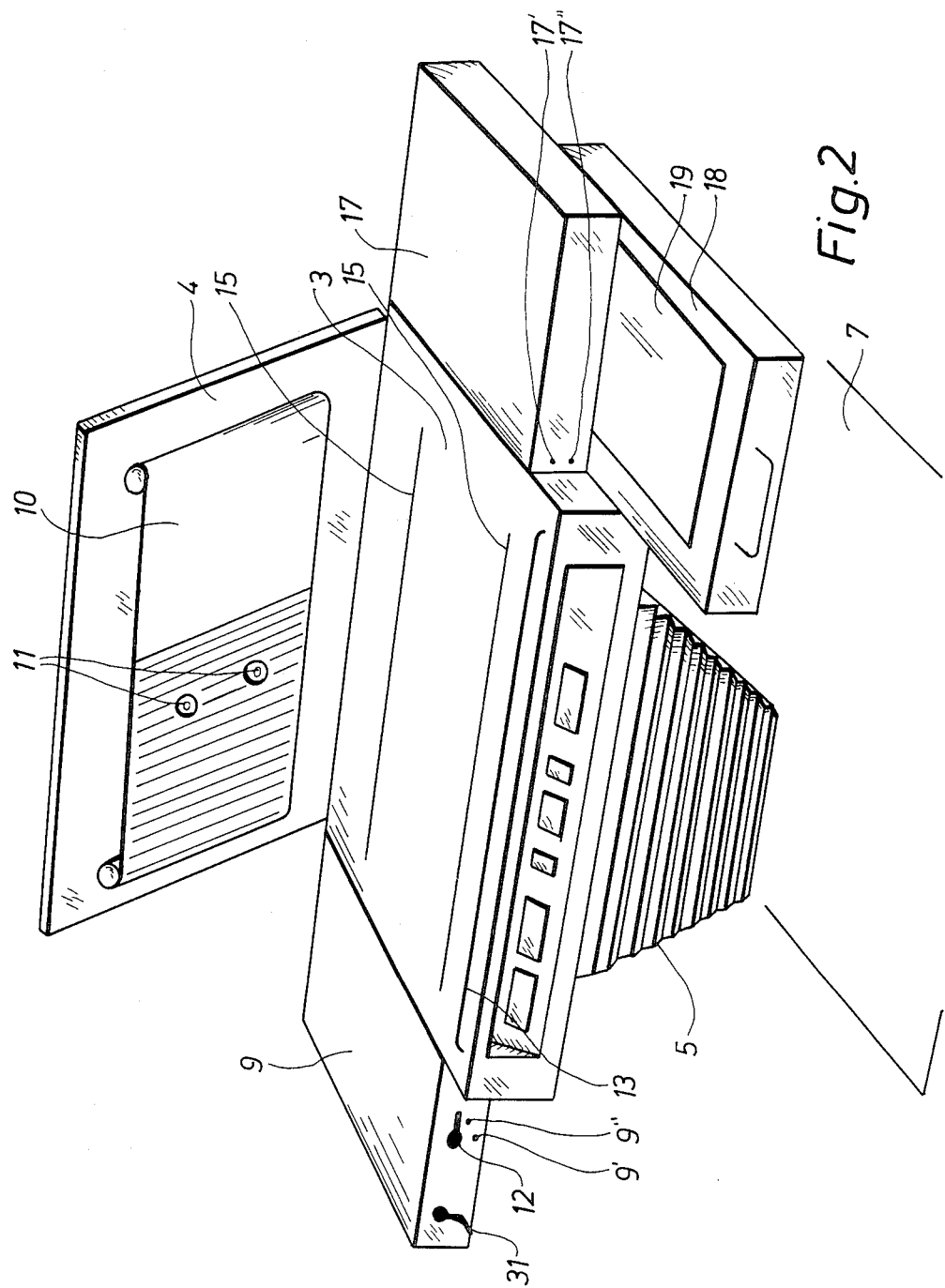
FIG. 2 illustrates the reproduction camera of FIG. 1 whereby the lid is opened and reveals a conveyor band therein.
Figure 3:
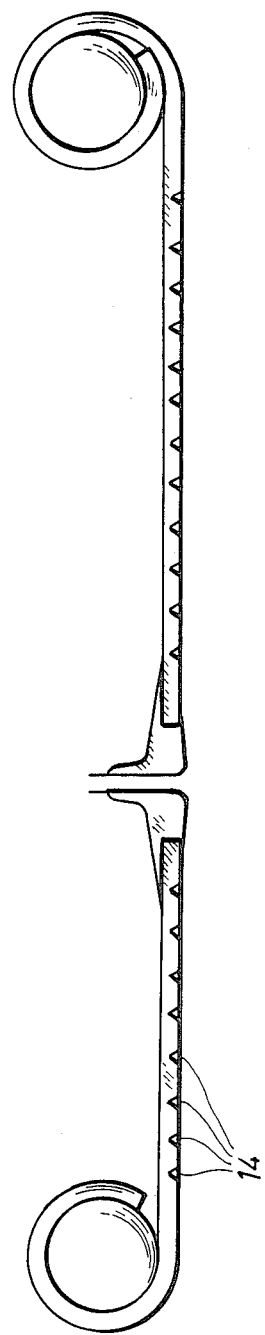
FIG. 3 is a sectional view of the conveyor band.
Figure 4:
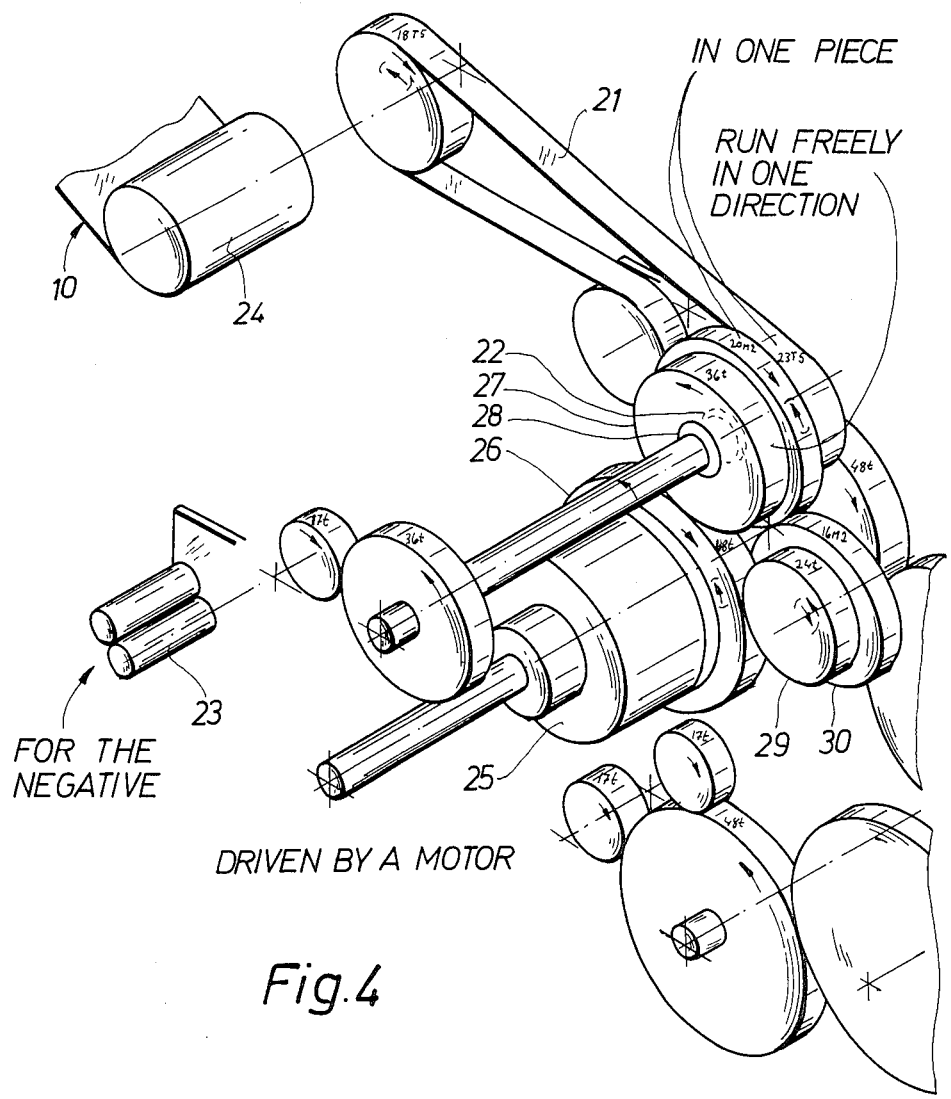
FIG. 4 illustrates the return drive of the conveyor band.

The delivery of a desired length of light-sensitive material from a delivery roll in a container 9 to the left of the picture plane is controlled by means of a handle 31 and a first pair of rollers 9', 9''. The advancing to the picture plane 3 is carried out by means of a conveyor band 10 with one or more suction cups 11, said suction cups 11, however, not being activated until the moment the light-sensitive material is cut off (by means of a handle 12). Simultaneously with the cutting off, a decoupling of the first pair of rollers 9', 9'' occurs by a displacement of a gear wheel. Prior to the cutting off the light-sensitive material is advanced in the desired length, said length being detected by means of a tape measure 13, cf. FIG. 2, being advanced parallel to the conveyor band and the light-sensitive material. When the light-sensitive material is correctly positioned in the picture plane the conveyor band 10 tightly abuts the underlying glass plate 3, said conveyor band 10 being provided with transverse grooves 14, cf. FIG. 3, capable of tightly abutting longitudinal grooves 15 in and along the rim of the underlying glass plate 3. These transverse grooves 14 are evacuated through the longitudinal grooves by actuating a control valve. The grooves 14 in the conveyor band 10 are preferably of a height of about 0.1 mm and interspaced about 0.3 mm. The grooves 14 end at a suitable distance from the rim of the conveyor band 10. After one or more exposures, optionally 'step and repeat', in connection with the diaphragming of the exposure area and a release from the transverse grooves 14, the film is advanced to a developing container 17 to the right of the picture plane. When the front rim of the light-sensitive material reaches the developing container 17, a limit switch in connection with the tape measure 13 is activated. This limit switch activates in turn a second pair of rollers 17', 17'' to join the light-sensitive material with the positive in the developing container 17. At the same time as the light-sensitive material is delivered to the developing container 17, the knife is returned at 12 whereby the vacuum of the suction cups 11 is removed and the first pair of rollers 9', 9'' is reengaged by means of an electromagnet activated by the limit switch. Furthermore the conveyor band 10 is automatically returned by means of the return drive shown in FIG. 4, said return drive also being positioned to the right of the picture plane. This return drive comprises inter alia a toothed belt 21 and a free running wheel 22 which is running freely in one direction. The conveyor band 10 at the roll 24 drives a second pair of rollers 23 through the toothed belt 21, the free running wheel 22, and some gear wheels, said second pair of rollers advancing the negative. The second pair of rollers 23 may alternatively be driven by the above motor by activation of a magnet coupling 25. This magnet coupling is activated by front rim registration of positive and negative film by means of two gear wheels 26, 27 and a free running wheel 28 which is running freely in one direction in order to avoid the negative being stuck at the first pair of rollers. The automatic returning of the conveyor band 10 is obtained by means of two gear wheels 29, 30 between the gear wheels of the magnet coupling 25 and optionally integrally cast gear wheels on the belt wheel driven by the conveyor band 10. The pair of rollers of the negative is controlled by the magnet coupling 25 in such a manner that the negative is released at the moment the rims of the negative and the positive meet one another. The negative and the positive are separately inserted and are moistened by means of an activator and subsequently pressed together by means of a set of discharge rollers. Finally the negative and the positive is positioned in an opaque box 33 allowing diffusion of pure silver.

The developing procedure presents great requirements to the embodiment of the developing container 17 with respect to geometry, bath lengths etc. As the negative appears with the emulsion facing downwards, the positive must be positioned below said negative. A further desire is to use a well-functioning drawer for positives in view of the restrictions presented as to room, appearance, and service comfort. According to the invention a drawer 18 is provided, which can be pulled out in front of the camera, cf. FIG. 2, and which is positioned below the developing container 17. The positive 19 is put into this drawer 18 and inserted between a pair of rollers. The drawer 18 is pushed inwards below the developing container 17 whereby the rollers 17′, 17″communicate with the motor of the developer through a claw clutch. When starting the motor the positive is turned 180 degrees by means of guide means and inserted in the developing container 17 below the negative. Such a drawer 18 allows a front operation.

As a result there is provided a daylight camera which may be controlled by one handle 31. A raster may be provided in front of the light-sensitive material during the exposure.

We claim:

1. A reproduction camera comprising: a supporting frame with an original plane, an objective plane and a picture plane, said planes being mutually displaceable toward and away from each other; a delivery roll adjacent one end of the picture plane for holding a roll of light sensitive material; a first pair of rollers for advancing light sensitive material from the delivery roll toward the picture plane; means for cutting the light sensitive material when a desired length thereof has been delivered by said rollers; a developing container adjacent the end of the picture plane which is opposite the delivery roll; and an opaque conveyor band overlying the picture plane and serving as a flexible cover for transporting the light sensitive material to the picture plane and thence to the developing container after the light sensitive material has been cut by said cutting means, said conveyor band being provided with transverse grooves which can be evacuated and said conveyor band including at least one suction cup facing the picture plane.

2. A camera as in claim 1 wherein the grooves in said band have a depth of about 0.1 mm.

3. A camera as in claim 2 wherein the grooves are spaced apart about 0.3 mm.

4. A camera as in claim 1 wherein said picture plane includes a transparent plate having at least one longitudinal groove extending along each edge portion in the direction of transport of the light sensitive material, the transverse grooves in said conveyor band being tightly abuttable with said longitudinal grooves.

5. A camera as in claim 4 wherein said longitudinal grooves are connectable to a vacuum pump.

* * * * *